US011550908B2

(12) United States Patent
Long et al.

(10) Patent No.: US 11,550,908 B2
(45) Date of Patent: Jan. 10, 2023

(54) METHOD AND APPARATUS FOR PRODUCING A MACHINE LEARNING SYSTEM FOR MALWARE PREDICTION IN LOW COMPLEXITY SENSOR NETWORKS

(71) Applicants: Paul J Long, San Francisco, CA (US); Ian L Sayers, South Shields (GB)

(72) Inventors: Paul J Long, San Francisco, CA (US); Ian L Sayers, South Shields (GB)

( * ) Notice: Subject to any disclaimer, the term of this patent is extended or adjusted under 35 U.S.C. 154(b) by 350 days.

(21) Appl. No.: 16/810,182

(22) Filed: Mar. 5, 2020

(65) Prior Publication Data
US 2020/0293655 A1  Sep. 17, 2020

Related U.S. Application Data

(60) Provisional application No. 62/818,747, filed on Mar. 15, 2019.

(51) Int. Cl.
*G06F 21/00* (2013.01)
*G06F 21/56* (2013.01)
(Continued)

(52) U.S. Cl.
CPC ............ *G06F 21/56* (2013.01); *G06F 21/602* (2013.01); *G06N 20/00* (2019.01)

(58) Field of Classification Search
CPC .................. G06F 21/56; G06F 21/602; G06F 2221/2107; G06N 20/00; G06N 3/0436;
(Continued)

(56) References Cited

U.S. PATENT DOCUMENTS 9,497,204 B2 * 11/2016 Symons ............. H04L 63/1441
9,825,976 B1 * 11/2017 Gomez ............... H04L 63/1416
(Continued)

FOREIGN PATENT DOCUMENTS

CN          105491562 A  *  4/2016
CN          109639762 A  *  4/2019  ............ H04L 41/044
WO  WO-2017209845 A1 * 12/2017  ............ G06F 21/552

*Primary Examiner* — Don G Zhao

(57) ABSTRACT

One embodiment of this invention describes a method and apparatus for the use of Machine Learning to efficiently detect, identify, prevent, and predict cyber-attacks on Low Power and Low Complexity Sensor 100 (FIG. 1) networks that have low data transmission requirements, something that all current Machine Learning techniques are unable to accomplish due to numerous restrictions when applied to Low Power and Low Complexity Sensors. Low Power and Low Complexity Sensors are frequently found in various Internet of Things (IOT) network architectures. The IOT is a network of physical devices, vehicles, home appliances, and other items embedded with electronics, software, sensors, actuators, and connectivity which enables them to connect and exchange data, providing more direct integration of the physical world into computer-based systems. However, this should not restrict the applicability of any potential embodiment of this invention as described in this patent application.
A further understanding of the nature and the advantages of the particular embodiments disclosed herein may be realized by referencing the remaining portions to the specification.

11 Claims, 6 Drawing Sheets

(51) Int. Cl.
*G06N 20/00* (2019.01)
*G06F 21/60* (2013.01)

(58) Field of Classification Search
CPC ...... G06N 3/0445; G06N 5/003; G06N 20/20; G06N 7/005
See application file for complete search history.

(56) References Cited

U.S. PATENT DOCUMENTS

| | | | | |
|---|---|---|---|---|
| 9,838,417 | B1* | 12/2017 | Khalid | G06F 21/566 |
| 10,097,573 | B1* | 10/2018 | Aziz | H04L 63/20 |
| 10,320,813 | B1* | 6/2019 | Ahmed | H04L 63/1416 |
| 10,476,906 | B1* | 11/2019 | Siddiqui | H04L 63/1425 |
| 10,671,721 | B1* | 6/2020 | Otvagin | H04L 63/145 |
| 10,785,255 | B1* | 9/2020 | Otvagin | H04L 63/145 |
| 10,805,346 | B2* | 10/2020 | Kumar | H04L 63/0227 |
| 10,893,059 | B1* | 1/2021 | Aziz | G06F 21/53 |
| 10,897,472 | B1* | 1/2021 | Viglione | H04L 63/1491 |
| 11,102,244 | B1* | 8/2021 | Jakobsson | H04L 51/42 |
| 11,227,047 | B1* | 1/2022 | Vashisht | G06F 21/552 |
| 2012/0197856 | A1* | 8/2012 | Banka | H04L 67/2885 |
| | | | | 707/706 |
| 2013/0104236 | A1* | 4/2013 | Ray | H04L 63/1408 |
| | | | | 726/25 |
| 2014/0157405 | A1* | 6/2014 | Joll | H04L 63/1425 |
| | | | | 726/22 |
| 2015/0351673 | A1* | 12/2015 | Vanslyke | A61M 5/1723 |
| | | | | 600/301 |
| 2016/0119365 | A1* | 4/2016 | Barel | G06F 16/95 |
| | | | | 726/12 |
| 2016/0256080 | A1* | 9/2016 | Shen | A61B 5/6891 |
| 2016/0275776 | A1* | 9/2016 | Shen | A61B 5/024 |
| 2016/0328742 | A1* | 11/2016 | Shiravi Khozani | |
| | | | | G06Q 30/0248 |
| 2017/0214702 | A1* | 7/2017 | Moscovici | H04W 12/106 |
| 2018/0212985 | A1* | 7/2018 | Zadeh | H04L 63/1425 |
| 2018/0214051 | A1* | 8/2018 | Larson | A61B 5/02055 |
| 2019/0042738 | A1* | 2/2019 | Juliato | H04L 63/1466 |
| 2019/0049968 | A1* | 2/2019 | Dean | G05D 1/0214 |
| 2020/0036732 | A1* | 1/2020 | Grubel | G06N 20/00 |
| 2020/0104876 | A1* | 4/2020 | Chintakindi | A61B 5/6898 |
| 2020/0202184 | A1* | 6/2020 | Shrestha | G06N 20/20 |

\* cited by examiner

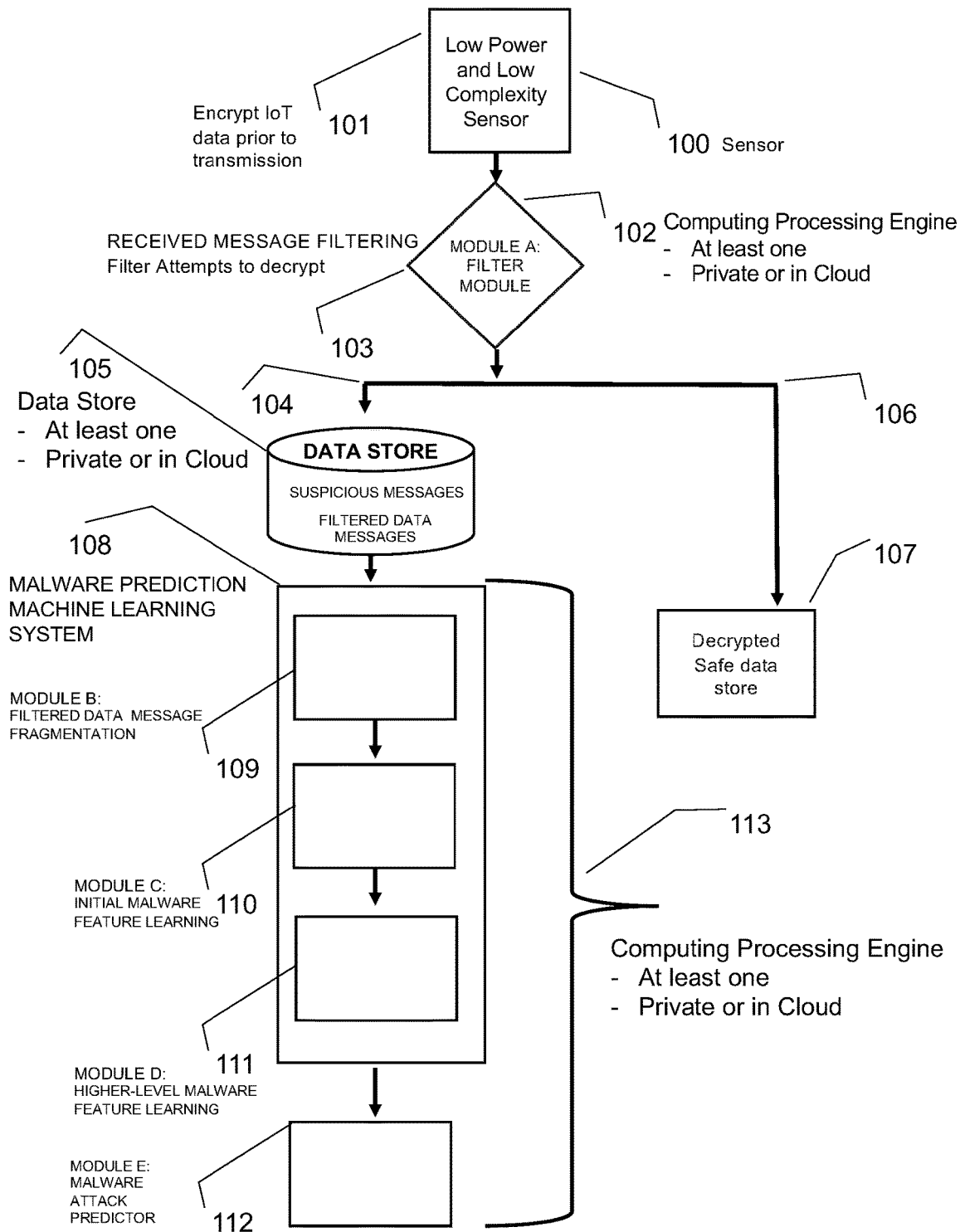

Fig 2: MODULE A: RECEIVED MESSAGE FILTERING
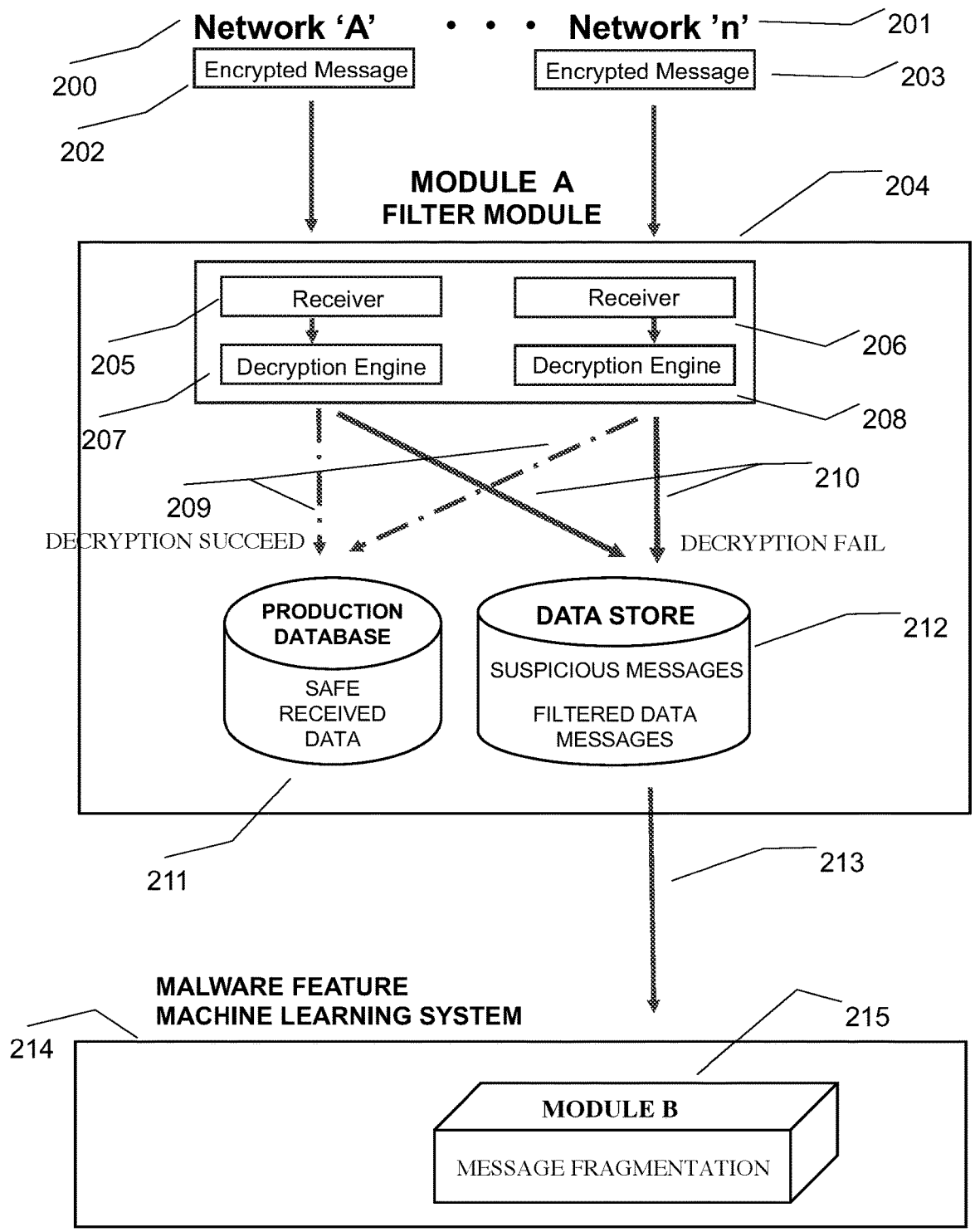

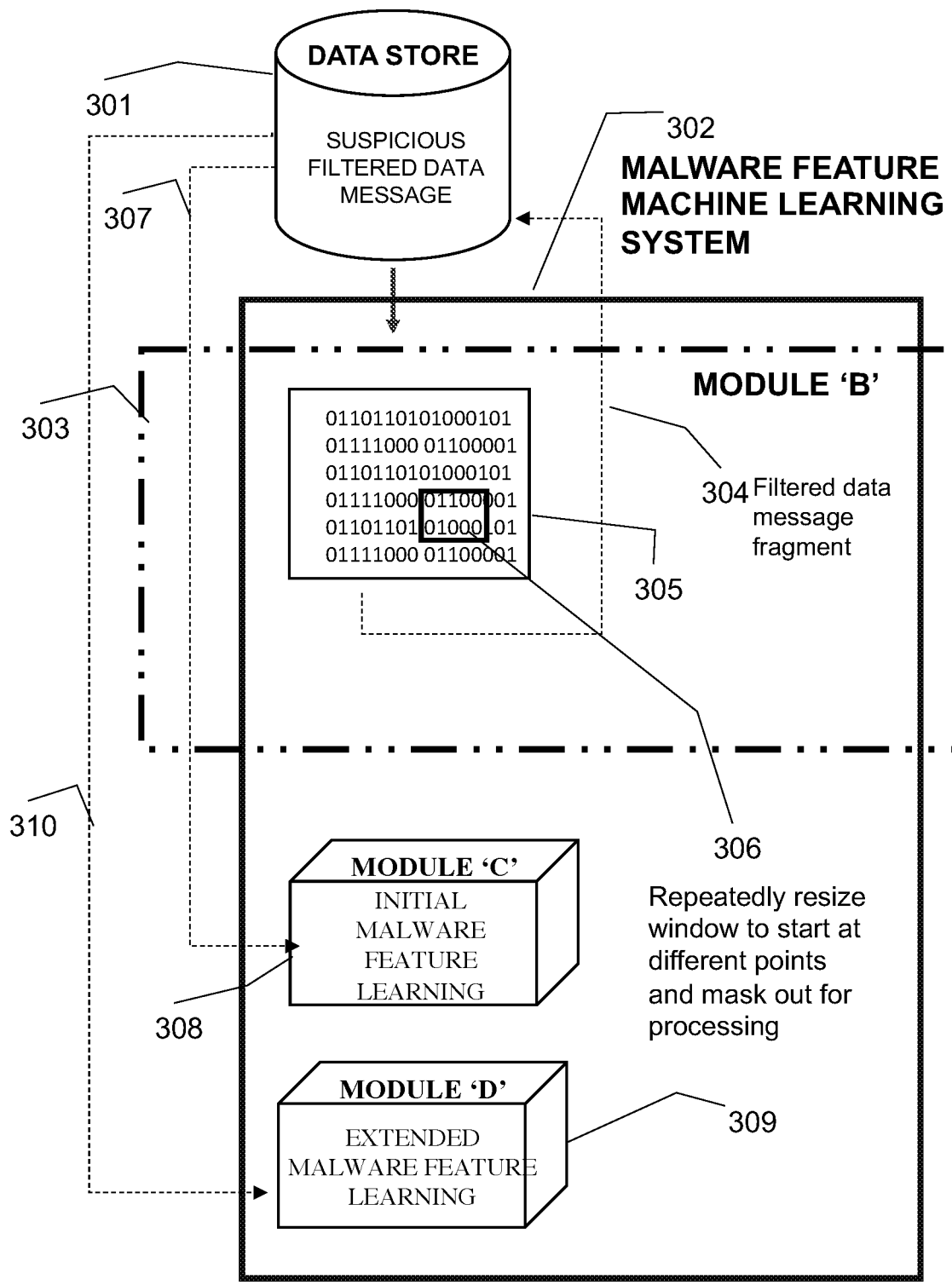

Fig 4: MODULE C: INITIAL MALWARE FEATURE LEARNING
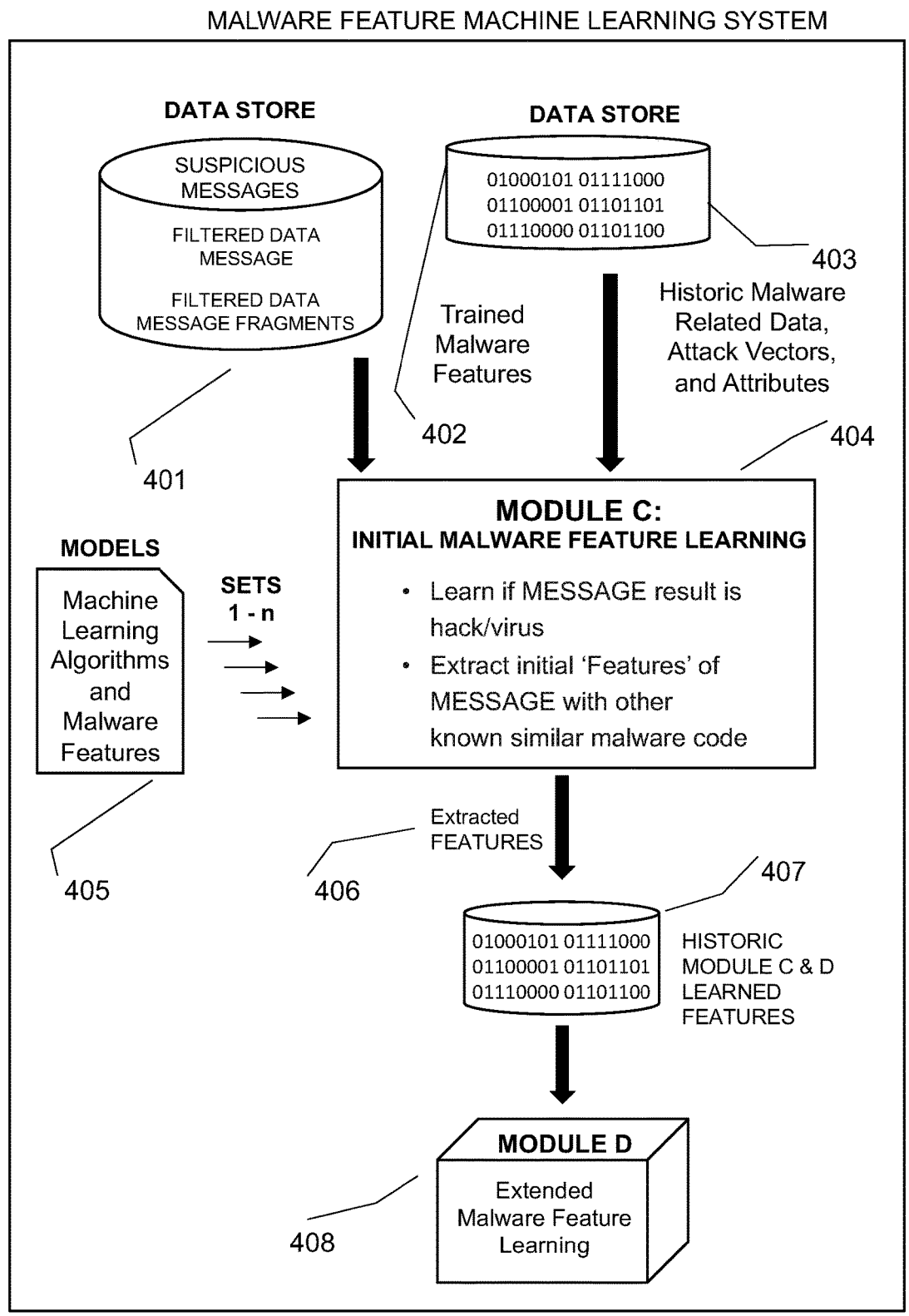

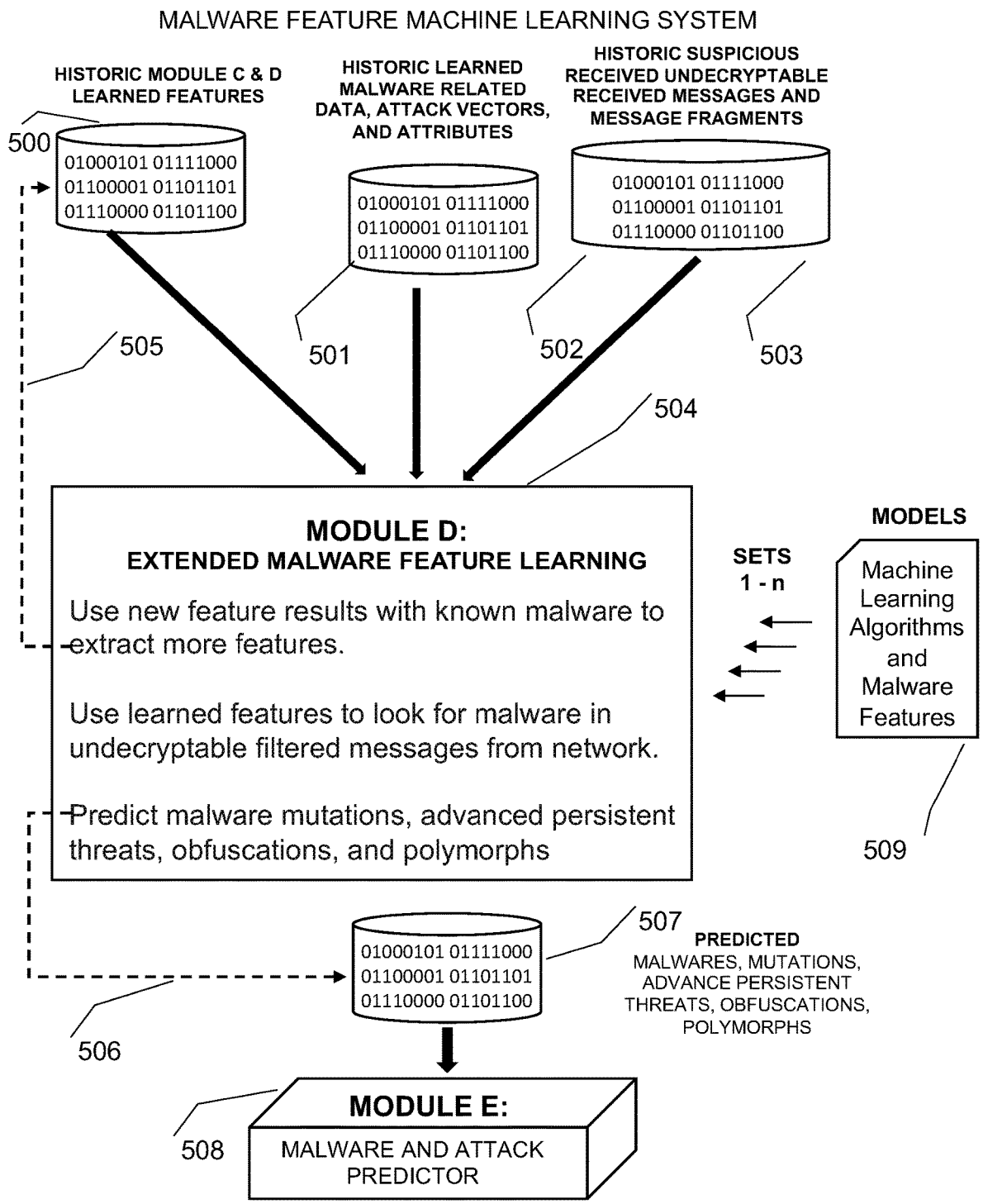
Fig 5: MODULE D: HIGHER-LEVEL MALWARE FEATURE LEARNING

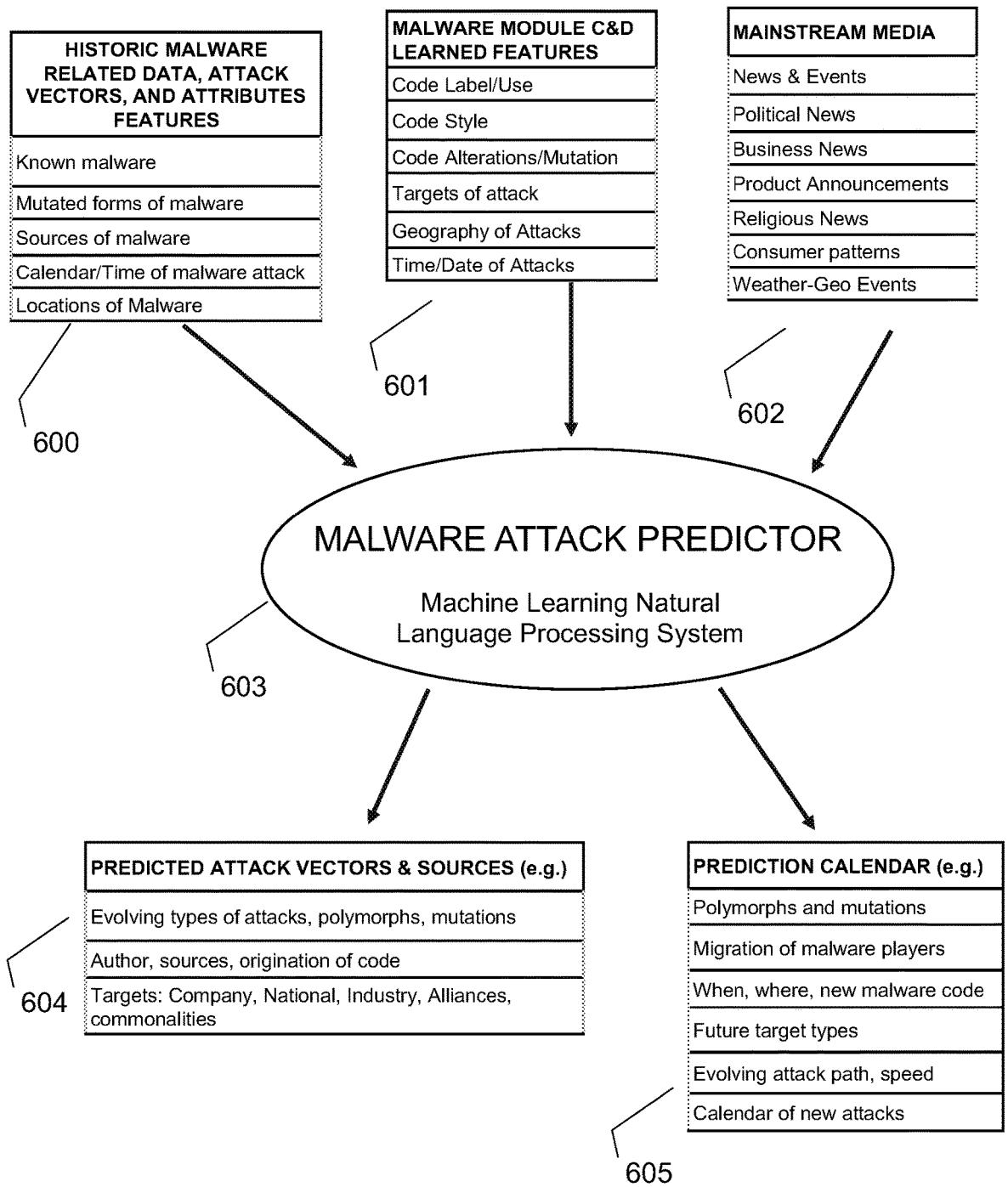
Fig 6: MODULE E: MALWARE ATTACK PREDICTOR

METHOD AND APPARATUS FOR PRODUCING A MACHINE LEARNING SYSTEM FOR MALWARE PREDICTION IN LOW COMPLEXITY SENSOR NETWORKS

CROSS REFERENCE TO RELATED PATENT APPLICATIONS

U.S. Pat. No. 10,367,794. METHOD AND APPARATUS FOR SECURING A SENSOR OR DEVICE. Awarded: 30 Jul. 2019.

USPTO Provisional Patent No. 62/527,449. METHOD AND APPARATUS FOR IDENTIFYING, PREDICTING, PREVENTING NETWORK MALICIOUS ATTACKS. Filing Data: 30 Jun. 2017.

BACKGROUND TO INVENTION

Today malware Cyber-attacks constantly overwhelm computer systems making it desirable to be able to identify and prevent malware attacks in real time. Unfortunately the current state of the art requires the maintenance of large libraries of discovered malware programs, necessitating fast computing hardware, while also employing large bandwidth digital communications in order to continually update the system and the attack targets. The updates frequently occur long after the malware has already had its desired impact. Such an arcane scheme cannot be used with Low Power and Low Complexity Sensors due to their inherent limited computing resources, low bandwidth communications links and the sheer number of such units, numbering in the billions based on some estimates [REF. 1]. Due to these limitations Low Power and Low Complexity Sensors are extremely vulnerable to cyber-attacks and currently do not receive the required level of protection despite the fact they will and do control many crucial aspects of modern society.

Machine Learning technology promises a possible solution to the cyber-attack malware dilemma [REF. 2], [REF. 3], [REF. 4]. One implementation of Machine Learning is as Artificial Neural Network (ANN) technology, a connectionist system (i.e. interconnected networks) functioning as a computing system, this technology is inspired by living neural networks (e.g. the human brain). An ANN is comprised of Machine Learning computational models that, without being programmed with any task-specific rules, can learn capabilities such as image recognition, constructing sentences in human/computer languages, and even creating entire stories, narratives and music.

Based upon contemporary Machine Learning research it could potentially be a solution to the currently massive processing power required for malware identification, and prevention in today's networks and more specifically for Low Power and Low Complexity Sensor networks. It is lamentable that Machine Learning's current state of the art anti-malware methods are not real time. Machine Learning has proven unpredictable with respect to system delay and message delivery due to the rapidity of new malware releases as well as the many different methods of attacking systems either through software, operating systems, and/or hardware [REF. 5].

Furthermore new cyber-attacks are continually released daily. Hackers and cyber-terrorists quickly modify malware by means of mutating the source-code, designing advanced persistent threats, obfuscating the code, and creating polymorphs. These mutations, Advanced Persistent Threats [REF. 13], obfuscations, and polymorphs [REF. 12] may be classified simply as Evolving Malware Threats. Any delay in updating Machine Learning malware libraries and the latest malwares will have impacted all vulnerable systems by the time current Machine Learning systems are able to learn to identify these new attacks. Hence existing Machine Learning systems cannot provide real time protection. In practice it has been found that it is impossible for users and devices to detect and react to the malicious attacks until other devices have already been compromised and an anti-hack response has been learned, engineered and deployed.

Today's Machine Learning methods applied to cybersecurity exhibit several major limitations with regard to speed and flexibility especially in adapting to new malwares, the time required to process infected data, plus the frequent retraining required:

a) State of the art methods rely on starting the process by quarantining all incoming files and then analyzing them non-real time. The fact that these methods do not filter/screen the data means that false positives will be analyzed, potentially diluting the effectiveness of the technique as well as wasting valuable time pursuing cases that will not lead to a successful conclusion. Given the trillions of messages transmitted daily, it is a computing impossibility to keep pace.

b) Machine Learning systems use expensive computing intensive platforms to continually compare potentially malware infected messages to newly released malware, which means that realistically it is impossible to keep pace with new malware.

c) Machine Learning systems today are not scalable due to the quarantining delays and computing power required.

Today there are 3 primary representative Machine Learning anti-malware models available; other derivative concepts also exist but none are real-time:

a) U.S. Pat. No. 9,853,996 B2, [REF. 6] describes a method to Machine Learn from quarantined Email, HTML, and meta-data by learning their API. These messages are scanned and inspected non-real time, using a centralized rules-base to ensure that the messages do not attempt to access restricted data or upload data into restricted systems.

This method is very slow, not real time and not scalable due to the significant data processing requirements. This scheme operates by cross-correlating large databases of individual user profiles with their historic activity compared to known irregular/misbehavior in the network. User profiles are used to search a database of computer logons and emails to identify irregular or misbehaving logons or emails activities. Extensive manual profile building must be performed by the company Information Technology (IT) department to characterize multiple characteristics of devices and users. e.g. operating system, computer model, IP address, MAC address, time of day (TOD), server addresses, passwords, etc. Once an email or file is detected as abnormal, the mail, file and/or executable is moved to a quarantine area, and activated to observe malware indicators as the program executes real-time. However meanwhile neither the sending nor receiving party know the message's status. This solution is not appropriate for detecting cyber-attacks of large IOT networks.

b) Application Programming Interface (API) Learning is a Machine Learning method to learn quarantined malware APIs by recording their step-wise execution steps. The Machine Learning system attempts to predict if a quarantined executable is malicious based on a short snapshot of its behavioral data [REF. 7]. An ensemble of Recurrent Neural Networks (RNN) is able to predict whether an executable is malicious or benign. This provides a possible step towards IOT security by the fact that malicious behavior is predicted during execution rather than detecting the malware post-execution and having to repair the damage. However, this is still not suitable for use in a large IOT network and would fail when presented with the potentially billions of messages found in such a network due to the long delays required to quarantine, activate, and analyze. This approach also requires frequent retraining of the system for it to remain current/up-to-date with new malwares as they appear; this necessitates significant and ongoing human management and configuration of the Machine Learning system.

c) Viral Image Learning is a Machine Learning method [REF. 8] in which all incoming files are first quarantined and converted into greyscale images. Each image is then compared to a library of known greyscale malware images, and a probability match is then calculated using Convolutional Neural Networks (CNN) Machine Learning tools. CNN is normally used for image recognition such as for autonomous cars or facial recognition rather than examining the content of a data file for malware. The penalty for using CNN is again in terms of delay in delivering the data, as well as the enormous costs associated with converting all files to greyscale and then comparing it to the virtually unlimited number of malware images which need to be updated daily. This approach also requires frequent retraining of the system for it to remain current/up-to-date with new malwares as they appear, again necessitating significant and ongoing human management and configuration of the Machine Learning system as with the API Machine Learning method described previously. Thus the Viral Image Learning method is difficult to scale for commercial applications with a high volume of data messages.

The invention described herein addresses all of the above current art Machine Learning restrictions making it applicable to Low Power and Low Complexity Sensors and other network types, by:

a) Providing a method to filter suspected malware prior to it entering the system. Pre-filtering messages to reduce the volume eliminates the typical Machine Learning system delays, which routinely require significant time to examine and release messages from quarantine. In this embodiment the filtering technique is based upon encryption methods outlined in U.S. Pat. No. 10,367,794, included here by reference. A person skilled in the art could apply other methods to filter suspicious messages without requiring any changes to subsequent steps elaborated in this invention.

b) Training the system with data using but not limited to historic malware source-code, history of malware authors, and known locations of sources of malware attacks.

c) Identifying malware in its received form, this invention learns and identifies the patterns of the received malware faster than:

1) Quarantining and matching entire malware programs as is typical with current Machine Learning methods that need to identify specific malware code or match entire malware executables.

2) Quarantining and observing the malware execution real time, in order to learn the malware's Application Program Interface (API).

d) Not requiring disassembly and/or decompiling binaries in order to match to actual malware machine-language or high-level code.

e) Not attempting to identify malware in machine-language or high-level code that has mutated or been obfuscated.

f) Not requiring additional hardware in order to scale to meet the processing and programmer maintenance requirements.

g) Combining news and current information with what the system has learned about various malware and its attack vectors in order to predict future malware mutations and attacks.

A further understanding of the nature and the advantages of particular embodiments disclosed herein may be realized by reference to the remaining portions of the patent application description and the attached drawings.

REFERENCES

1. "Global IoT market size 2017-2025". Published by Shanhong Liu, Oct. 24, 2019. Statista GmbH Johannes-Brahms-Platz 1 20355 Hamburg Germany.

2. "Applying Machine Learning to Advance Cyber Security Analytics" http://www.cybersecurity-review.com/industry-perspective/applying-machine-learning-to-advance-cyber-security-analytics/.

3. "Machine Learning for Network Intrusion Detection" http://ieeexplore.ieee.org/document/5504793/.

4. "Machine Learning for Cybersecurity", Towards Data Science, Alexander Polyakov Oct. 24, 2018.

5. "On the Feasibility of Online Malware Detection with Performance Counters", John Demme, Matthew Maycock, Jared Schmitz, Adrian Tang, Adam Waksman, Simha Sethumadhavan, Salvatore Stolfo; Department of Computer Science, Columbia University, NY, N.Y. 10027.

6. "System And Method For Identifying And Preventing Malicious API Attacks", Roey Eliyahu, Yavne Omer Sadika, Yad Binyamin: Inventors. USPTO US2018/032420, Granted: Nov. 8, 2018.

7. "Early-Stage Malware Prediction Using Recurrent Neural Networks", Rhode, Matilda, Burnap, Peter and Jones, Kevin 2018. Cardiff University Published: Computers and Security May 15, 2018.

8. "Convolutional Neural Networks for Malware Classification", Daniel Gibert, Universitat de Barcelona October 2016. Thesis presented for the degree of Master in Artificial Intelligence.

9. "Neural Network Zoo Prequel: Cells And Layers", The Asimov Institute Posted On Mar. 31, 2017 By Fjodor Van Veen.

10. "Foundation of Statistical Natural Language Processing, Christopher D. Manningm, Hinrich Schütze, The MIT Press, Cambridge Mass., 1999.

11. "A Study of Bayesian Neural Networks", Vikram Mullechery, Aniruddh Khera, Amir Husain, New York University, 2018, https://aexiv.org/pdf/1801.07710.

12. "Polymorphic & Metamorphic Malware", Chet Hosmer, WetStone Technologies, 2008.

13. "Advanced Persistent Threat (Apt) Detection Center", U.S. Pat. No. 9,628,507 B2, Haq et al, FireEye, Inc, Granted Apr. 18, 2017.

14. "Pattern recognition and machine learning", Bishop, Christopher (2006). Berlin: Springer. ISBN 0-387-31073-8.

15. "Feature Selection for Knowledge Discovery and Data Mining.", Liu, H., Motoda H. (1998) Kluwer Academic Publishers. Norwell, Mass., USA. 1998.

16. "Iterative feature construction for improving inductive learning algorithms", Piramuthu, S., Sikora R. T. In Journal of Expert Systems with Applications. Vol. 36, Iss. 2 (March 2009), pp. 3401-3406, 2009.

17. "Data-driven constructive induction: a methodology and its applications", Bloedorn, E., Michalski, R. IEEE Intelligent Systems, Special issue on Feature Transformation and Subset Selection, pp. 30-37, March/April, 1998.

18. "Classification and regression trees", Breiman, L. Friedman, T., Olshen, R., Stone, C. (1984) Wadsworth.

19. "Sentiment classification on customer feedback data: noisy data, large feature vectors, and the role of linguistic analysis", Michael Gannon (2004), Microsoft, Inc.

20. "Empirical Inference for Machine Learning and Perception", Isabelle Guyon, Clopinet, and Andre Elisseeff Department Max Planck Institute for Biological Cybernetics, Journal of Machine Learning Research 3 (2003) 1157-1182, "An Introduction to Variable and Feature Selection".

21. "Empirical Function Attribute Construction in Classification Learning", Simon P. Yip, School of Computer Science & Software Engineering, Swinburne University of Tech., Geoffrey I. Webb School of Computing and Mathematics, Deakin University, 1994 Pre-publication draft of a paper which appeared in the Proceedings of the Seventh Australian Joint Conference on Artificial Intelligence (AI'94), pages 29-36. Singapore: World Scientific.

22. "What is Machine Learning? 3 Things You Need to Know", Mathworks 2020: https:www.mathworks.com/discovery/machine-learning.html.

23. "Understanding Machine Learning: From Theory to Algorithms", Shai Shalev-Shwartz, Shai Ben-David, 2014 Cambridge University Press.

24. "Joint Many-Task Neural Network Model for Multiple Natural Language Processing (NLP) Tasks", Patent 2018/0121787, May 3, 2018, Kazuma Hashimoto, Caiming Xiong, Richard Socher.

25. 'A Joint Many-Task Model: Growing a Neural Network for Multiple NLP Tasks', Kazuma Hashimoto, Caiming Xiong, Yoshimas Tsuruoka, Richard Socher, The University of Tokyo, ICLR Conference Paper 2017.

26. "Rule extraction by successive regularization", M. Ishikawa, Neural Networks Vol 12, Issue 10 December 2000, pages 1171-1183.

BRIEF DESCRIPTION OF THE DRAWINGS

One embodiment of this invention and its advantages may be described with reference to the associated figures:

FIG. 1. Malware Prediction Machine Learning System High Level System Process Block Diagram is an overview of the processing steps for a Low Power and Low Complexity Sensor message from origination as it proceeds through the Malware Feature Machine Learning System and Malware and Attack Predictor.

FIG. 2. MODULE A: Received Message Filtering is a diagram detailing the process of the filter module to screen a Low Power and Low Complexity Sensor message that fails to decrypt.

FIG. 3. MODULE B: Filtered Data Message Fragmentation is a diagram detailing the process for fragmenting suspicious filtered data messages.

FIG. 4. MODULE C: Initial Malware Feature Learning is a diagram detailing how a suspicious filtered data message and its filtered data message fragments are processed in order to learn if malware data exists.

FIG. 5. MODULE D: Higher-Level Malware Feature Learning is a diagram detailing the process for further learning and identifying malware using all historic Module C learned extracted features, historic malware features, and historic suspicious received messages to predict new malware mutations, advanced persistent threats, obfuscations, and polymorphs.

FIG. 6. MODULE E: Malware Attack Predictor is a diagram detailing the application of Natural Language Processing to analyze streaming information from global news, current events, and all published data information (i.e. Mainstream Media) with learned Modules C&D learned features, and historic malware related data, attack, vectors, and attribute features to predict future cyber-attack targets, types, and calendar.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, a computing processing engine, or other electronic computing device, that manipulates and/or transforms data represented as physical (e.g. electronic) quantities within the computer's registers and/or memories into other data similarly represented as physical quantities within the computer's registers and/or memories or other information non transitory processor—readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, element, units, parameters, or the like. The term set when used herein may include one or more items. Unless explicitly stated, the method embodiments described herein are not constrained to a particular order or sequence. Additionally, some of the described method embodiments or elements thereof may occur or be per formed simultaneously, at the same point in time, or concurrently.

Malware Prediction Machine Learning System Components

In one embodiment of the invention the Malware Prediction Machine Learning system is comprised of but not limited to the following hardware and software components:
a) a plurality of computing processing engines;
b) at least one computing processing engine configured with at least one filter module;

c) at least one computing processing engine configured to run at least one Machine Learning system module;
d) at least one computing processing engine with at least one attached data store;
e) at least one data store configured to store information;
f) at least one date store configured as a database of Machine Learned Malware Schema;
g) at least one data network to provide information to the system;
h) at least one Machine Learning system module configured to read data from at least one data store; and
i) at least one computing processing engine coupled to at least one data network.

High Level System Process Block Diagram

The high-level diagram of this invention (FIG. 1) provides an overview of the major components of this invention's system, tracing a received Low Power and Low Complexity Sensor message as it is processed through the system. The invention's at least one computing processing engine 102, 113 may reside in a private computing environment, or in the Cloud (e.g. Microsoft Azure™ Machine Learning, Amazon Web Services (AWS™) Machine Learning, IBM Watson™ Machine Learning, and Google Cloud™ Machine Learning).

Machine learning is the scientific study of algorithms and statistical models that computer systems use to perform a specific task without using explicit instructions, relying on patterns and inference instead. It is seen as a subset of artificial intelligence. This invention provides a novel and unique Machine Learning security method which is described in 5 modules: (A-E) (FIG. 2, FIG. 3, FIG. 4, FIG. 5, FIG. 6) and employs well known Machine Learning methods currently in favor which include but not limited to: Long-Short-Term-Memory (LSTM) [REF. 9], Convolutional Neural Networks (CNN) [REF. 9], Natural Language Processing [REF. 10], Bayesian Neural Network (BNN) [REF. 11], Recurrent Neural Network (RNN) [REF. 9], and Gated Recurrent Unit (GRU) [REF. 9], or new methods as they become available, and does not rely upon these aforementioned methods.

A Low Power and Low Complexity Sensor message 100 in this embodiment of the invention as shown in FIG. 1 is processed through the system as listed following:
a) Message is encrypted prior to transmission 101.
b) Module A 102 filter module attempts to decrypt the encrypted message.
c) Undecryptable messages are filtered out and placed in a data store 105.
d) The Malware Feature Machine Learning System 108 retrieves the message from the data store for processing.
e) Module B 109 fragments the message into various sized chunks.
f) Module C 110 applies machine learning on the message and its fragments to identify potential presence of malware.
g) Module D 111 uses all prior learned Malware Schema Features and prior received messages to learn Malware Higher-Level Schema Features and predict malware mutations
h) Module E 112 uses Natural Language Processing on all prior Module C and Module D results with Mainstream Media to predict new attacks.

System Training (Learning)

One embodiment of this invention requires that the Machine Learning system module is initially trained to learn the features of existing malware by applying Machine Learning algorithms. A malware feature is expressed as a vector, equivalent to that of a variable used in statistical techniques such as linear regression. The system creates a feature (vector) from prior existing malware which is defined as a mathematical vector, expressing multiple measurable properties or characteristics of the malware being observed including but not limited so such characteristics as its size, number of coding instructions, date observed, memory used etc. and storing these models back into the data store 402 as features.

The Machine Learning system module learns malware features by applying Machine Learning algorithms to at least one data store 403 configured to store a plurality of historic malware related data such as source-code, malware authors, attack vectors, previous malware attack targets, previous malware attack locations, and historic malware attack dates; this collection of data is grouped together collectively as Malware Schema. The Machine Learning system module constructs malware feature sets 402 for predicting malware by first starting with a large pool of malware features then deconstructing existing and known malware from the malware related data store 402 and finally reducing the number of malware features to a smaller number that will be used by the Machine Learning system module to predict Malware Schema Features.

Next, the Machine Learning system module performs Malware Schema Features manipulations and normalization to transform the original malware features thereby decreasing the sample complexity of the final malware system learning algorithm, its bias, or its computational complexity. This training results in a final Machine Learning 405 model for the invention in the form of a combination of Machine Learning Algorithms and Feature Sets models used to predict the presence of malware in filtered data messages 212, 301.

Both Supervised and Unsupervised training may be used to iteratively use different Machine Learning and prediction algorithms for pattern recognition, classification and regression employing well-known Machine Learning algorithms as referenced previously. The system performs Multiclass categorization [REF. 23 p 227] in order to classify received data message fragment instances into one of several possible target classes (i.e. predictor h:X→Y, where Y is a finite set of malware categories). (e.g. X is the set of received message fragments and Y is the set of possible malware classes).

Supervised Learning is accomplished using well known Machine Learning classification algorithms which include but are not limited to: support vector machine (SVM), boosted and bagged decision trees, k-nearest neighbor, Naïve Bayes, discriminant analysis, logistic regression, and neural networks, or regression algorithms which include but are not limited to: linear model, nonlinear model, regularization, stepwise regression, boosted and bagged decision trees, neural networks, and adaptive neuro-fuzzy learning [REF. 22].

Unsupervised Learning may also be used for cluster analysis using well known Machine Learning algorithms which include but not limited to: k-means and k-medoids, hierarchical clustering, Gaussian mixture models, hidden Markov models, self-organizing maps, fuzzy c-means clustering, and subtractive clustering [REF. 22].

In one embodiment of this invention, Malware Higher-Level Schema Features can then next be obtained from identified and other available malware features which are added to the Malware Schema Feature vector; e.g. the feature DATACHANGE may be defined as DATACHANGE=VALUE plus REPLACE. This process is referred to as Feature Construction [REF. 16, REF. 21]. Feature Construction as described in this invention is the application of a set of constructive operators to a set of existing machine instruction Malware Schema Features resulting in construction of new Malware Schema Higher-Level Features.

Once the Machine Learning system module is trained to recognize existing malware and to therefore Machine Learn malware features, the resulting malware feature sets 405 are used to process filtered data messages and filtered data message fragments in Module C (FIG. 4). The resulting data store containing Machine Learned Malware Schema Features is also later used by Module D to identify newly learned Malware Higher-Level Schema Features, thus both the learned Malware Schema Features and Malware Schema Higher-Level Schema Features are placed back into the data store. This feed-back loop provides the invention with constant updated malware features to continually self-train, and update its historic data models and malware feature sets.

Module A: Received Message Filtering (FIG. 2), 204

One embodiment of this invention applies a filter test to separate incoming data messages into safe and unsafe classifications for processing. One embodiment of this invention requires that all Low Power and Low Complexity Sensor messages 100 are encrypted 101, 202, 203 prior to transmission to protect the contents. The encrypted message is transmitted on the network to a filter module 102, 204 which is comprised of at least one decryption algorithm. The encrypted message must be accepted by the filter module's receiver 205, 206 by complying with standard data communications network connectivity processes prior to filtering the message. The received data message is then tested by Module A's decryption engine 207, 208 which must successfully decrypt the received data message before the message may be accepted into the decrypted safe data store 107, 211. Decryptable messages 106, 209 are deemed safe as they have not been tampered with and thus benign to the system.

Undecryptable received data messages are characterized as suspicious messages indicating that the previously encrypted message had been tampered with and is a candidate for analysis. These suspicious messages 210 are in effect filtered and placed in the data store 105, 212 as a filtered data message and retrieved by a Machine Learning site 108, 214, 302 for processing. Any encrypted message that has been altered will not decrypt correctly and is therefore classified as a filtered data message.

This filtering process is easily performed real-time. The Machine Learning system represented by Modules A-E do not need to be invoked until a received data message fails to decrypt and is placed in the data store 105, 212 for the Machine Learning system 108, 214, 302 to access. This significantly reduces the Machine Learning processing requirements and expenses required to discover malware and is a key aspect of this invention which distinguishes it from the existing art.

Module B: Fragmentation 109, 302 (FIG. 3)

In one embodiment of this invention a computer processing engine is configured to retrieve filtered data messages from the data store 105, 212 to fragment into multiple different sized smaller messages or fragments, termed filtered data message fragments 306. Module B repeatedly fragments the filtered data message, varying the size of each fragment both by selecting different numbers of bits per fragment, and also by initiation the fragmentation at different points in the filtered data message. The resulting filtered data message fragments are placed back into the data store 301, 304 which is made available to Module C 212, (FIG. 3) for the next stage of processing.

This fragmentation process provides the Module C Malware Feature Learning system a database of fragments to input and Machine Learn features of these filtered data message fragments. Then the system compares these filtered data message fragment features to known malware features which the system previously learned by training itself from the historic Malware Schema and placing them in the data store 402.

Module C: Initial Malware Feature Learning 110, 404 (FIG. 4)

One embodiment of this invention comprises at least one computer processing engine configured with at least one Machine Learning system applying multiple different models comprised of Machine Learning Algorithms and Feature Sets models 405 to learn if the filtered data message and filtered data message fragments contain malware. In one embodiment the module can predict Evolving Malware Threats.

After Module B fragments the filtered data message into multiple sized fragments, Module C retrieves these messages from the data store to process and learn if these smaller filtered data message fragments 306, 401 are parts of a malware program. Module C learning is accomplished by transforming a filtered data message or filtered data message fragment into scalars or mathematical vectors representing malware type, family, and class as a feature function characterized as Malware Schema vectors. Module C learns if any simple (non-specific) features can be learned from these filtered data message fragments, and then comparing these learned simple features to known Malware Schema Features from the system's data store 402. Module C also learns if the filtered message fragments are malware by applying the known Malware Schema Features 402 using the Machine Learning Algorithms and Feature Sets 405 models to recognize malware. Module C performs an initial determination of malware existence by learning if the filtered data message fragment appears to be part of a known segment of a software snippet from a prior malware source using said Machine Learning Algorithms and Feature Sets models 405.

After Module C performs an initial malware identification, it then extracts the malware feature 406 for use in further identifying malware and its Malware Schema Higher-Level Features in Module C, D & E and placing it in the data store holding Module C & D learned features 407.

Some Malware Schema Features which may be represented as vectors might include but are not limited to:
 a) Embedded metadata—compiled programs that contain identifying details about their authors.
 b) Accidental embedding—compilers details on compiler flags used, which may include paths to source files.
 c) Common code—authors often reuse code from previous work. Machine Learning can spot a section of compiled code matching a previously learned section of code and identify the author.
 d) Common techniques—Machine Learning can detect patterns of coding and extract it as a Malware Schema Feature. A particular coding style is recognizable and likely not written by someone who uses a different style.

e) Malware origin—Text in specific languages or typos which suggest a particular background (e.g. 'color' would suggest that the author wasn't American, 'generale' might suggest someone used to writing in a Romance language such as French or Italian).

f) The Internet address or server location to which the malware connects may identify a known developer or group (e.g. Government body).

The above listed items are examples of the Module C Machine Learning Algorithms and Feature Sets model extracting Malware Schema Features 406, and clearly those skilled in the art could add further Malware Schema Feature extraction methods. The ability to easily add new Malware Schema Features by parsing malware code allows this invention to dynamically adapt to ever changing and evolving threats. This process also uniquely enables this invented Machine Learning system to begin to extract an initial set of Malware Schema Features to accelerate malware identification in future.

One embodiment of this invention uses a Machine Learning system configured with the Machine Learning Algorithms and Feature Sets 405 models to compare the received data message binary to malware related data binary in the data store 301. There are 4 advantages to this invention's function of comparing incoming Low Power and Low Complexity Sensor binary streams to malware binary code groups:

a) It is not necessary to disassemble or decompile binary code into original high-level source (e.g. C or JAVA computer language) to determine if it contains malware. The process of disassembling and decompiling is processor intensive and time-consuming.

b) Disassembling and decompiling actual malware code is inaccurate. It is more accurate and efficient to utilize malware comparisons based on malware message streams.

c) This invention detects and learns many times faster than humans are able, based on message patterns such as hunting for relationships several times removed or software code that has been obfuscated.

d) This invention's process reveals more mutations, Advanced Persistent Threats [REF. 13], obfuscations, and polymorphs [REF. 12] as it compares the filtered data message and filtered data message fragment to a known malware binary library directly rather than attempting to reconstruct the original source code prior to comparing to malware code.

Module D: Higher-Level Malware Feature Learning 111, 408, 504, (FIG. 5)

One embodiment of this invention comprises at least one computer processing engine configured with at least one Machine Learning system applying multiple different models comprised of Machine Learning Algorithms and Feature Sets 509 models to learn if the malware detected in Module C can be found in other non-decryptable databases 502 in order to predict new Evolving Malware Threats.

Using the new feature set learned from Module C, once Module D has learned the existence of this same Malware Schema Feature in its existing data store 502, the system then builds Malware Schema Higher-Level Features to extract more complex Malware Higher-Level Schema Features through feature construction [REF. 16, REF. 21]. This enables the Machine Learning Algorithms and Feature Sets models to:

a) assemble all these malware features that are now present in the data store of filtered data message fragment undecryptables, and organize these fragments into an identifiable known malware.

b) organize these fragments into similar looking malware to determine if a new polymorph or mutation has appeared by comparing to the malware library which also includes other polymorphs and mutations.

After a Malware Higher-Level Schema Feature mutation feature has been constructed Module D stores the new Malware Higher-Level Schema Feature in the data store as a Machine Learning Algorithm and Feature Set Output. Module C can then make use of this discovered Malware Schema Feature when it processes additional filtered data messages and filtered data message fragments.

In one embodiment of this invention Module C uses all Malware Schema Features available in the data store and retrieves all prior messages from the originating Low Power and Low Complexity Sensor, its subnet, its network, or system for similar Malware Schema Features. Using machine learning, Module C attempts to identify similar Malware Schema Features, and will then attempt to correlate all previously identified Malware Schema Features from the original Low Power and Low Complexity Sensor, or subnet, or network, or system in order to learn attack patterns and vectors by using the same Machine Learning Algorithms and Feature Sets model through Feature Construction [REF. 16, REF. 21] to correlate times, dates, locations and related attack and vector details.

Module E: Malware Attack Predictor 112, 603 504, (FIG. 6)

One embodiment of this invention comprises at least one computer processing engine configured with a further Machine Learning system implementing a process known to those skilled the art as Natural Language Processing [REF. 10] which functions as a Machine Learning Natural Language Processing module to predict future malware attacks. In this embodiment at least one or more Machine Learning Natural Language Processing modules are implemented as a Malware Attack Predictor 603.

Natural Language Processing is a process of computer manipulation of natural language such as counting word frequencies to compare different writing styles, or more complexly understanding human utterances and sentences to be able to understand sentiment, or give useful responses to questions. Natural Language Processing takes advantage of Deep Learning, which is a subset of machine learning where algorithms are created and function similar to those in machine learning, but there are numerous layers of algorithms—each providing a different interpretation to the data it feeds on.

Module E draws upon Mainstream Media in one layer, Malware Schema Features in another layer, and filtered data messages and filtered data fragments in yet another layer. The system is not limited by the numbers of layers it implements and one skilled in the art that the present invention may be practiced may extend the number of layers without constraint of the specific details presented herein.

Module E Machine Learning Natural Language Processing module utilizes Deep Learning to predict the type and timing of attacks by correlating Machine Learning Algorithm and Feature Set Output data from identified attacks learned by Modules A-D and the data store containing Mainstream Media 602 which consists of but not limited to current news and events, commercial products, politics, religion, finance, education, and transportation from live data fed from the Internet and other news media sources 602, historic malware related attack vectors, and attributes features 600, and malware Module C and Module D learned features 601 which the system has built from previous malware.

In one embodiment of the invention, the Malware Attack Predictor uses a 'joint many-task neural network model' [REF. 25], to solve a variety of increasingly complex natural language processing tasks using growing depth of layers in a single end-to-end model. The model is successively trained by considering linguistic hierarchies, directly connecting word representations from the Mainstream Media sources to all model layers, explicitly using feature predictions in lower tasks from this invention's Module C and Module D feature learning, and applying a successive regularization [REF. 26], which is accomplished by generating a small number of dominant rules at an earlier stage and less dominant rules or exceptions at later stages as technique to prevent catastrophic forgetting.

The Machine Learning Natural Language Processing module breaks down language from Mainstream Media 602 into shorter, elemental pieces, to understand relationships between the pieces and explore how the pieces work together within the context of the Malware Schema Features discovered by the system and its impact on organizations and governments. Typical higher-level Natural Language Processing capabilities include:

a) Content categorization. A linguistic-based document summary, including search and indexing, content alerts and duplication detection.

b) Topic discovery and modeling. Accurately capture the meaning and themes in text collections, and apply advanced analytics to text, like optimization and forecasting.

c) Contextual extraction. Automatically pull structured information from text-based sources.

d) Sentiment analysis. Identifying the mood or subjective opinions within large amounts of text, including average sentiment and opinion mining.

e) Speech-to-text and text-to-speech conversion. Transforming voice commands into written text, and vice versa.

f) Document summarization. Automatically generating synopses of large bodies of text.

g) Machine translation. Automatic translation of text or speech from one language to another.

In one embodiment of this invention, a Machine Learning Natural Learning Processing module is configured as a Malware Attack Predictor 603 to predict future malware events. The module applies Machine Learning Natural Language Processing to Mainstream Media with historic learned malware related data, attack vectors and attributes features; the module's linguistics and Natural Language Processing algorithms transform the text to learn new Malware Schema Higher-Level Features based upon the Machine Learning Algorithms and Feature Sets Output malware previously discovered by Modules C & D.

In one embodiment the Malware Attack Predictor 603 outputs the Predicted Malware Schema Features. These predictions provide a short-term outlook of Predicted Attack Vectors & Sources 604. A second longer range output Prediction Calendar 605 uses historic events and past calendars with Mainstream Media to predict the timeframe for new malware attacks, types of attacks, and characteristics of likely targets, while also providing an idea of how this evolving malware will have mutated based on the players, technology, and global events.

It will also be apparent to one skilled in the art that the present invention may be practiced without the specific details presented herein.

System Autonomous Operation and Self-Training

In one embodiment of this invention once the system has been fully trained and is processing live filtered data message and filtered data message fragments, it is able to operate autonomously to identify existing malware real-time as well as predict new and evolving forms of malware by evaluating new filtered data message and filtered data message fragments.

In one embodiment of this invention, as the Machine Learning systems continually identify new Malware Schema Features and create additional newly learned Malware Higher-Level Schema Features, the system in effect continually learns and continuously retrains itself as it encounters new Malware Schema Features and correlates them with pre-existing Malware Schema Features. This function eliminates the need for human operators to continually update and retrain the system. Another important advantage of this invention over existing malware detection schemes which require operator input to update the malware feature sets.

It should be clear from the description of the invention that the method could easily be adapted to other types of non-Low Power and Low Complexity Sensor networks to provide comparable levels of analysis and protection against malicious attacks to be shared with partners and member associations.

Although the description of the invention has been described with respect to particular embodiments thereof, these particular embodiments are merely illustrative, and not restrictive. Other embodiments of the invention may be implemented.

Particular embodiments may be implemented by using a programmed general-purpose digital computer, or by using application specific integrated circuits (ASIC), programmable logic devices (PLD), field programmable gate arrays (FPGA), optical, chemical, biological, quantum or nano-engineered systems, components and mechanisms. In general, the functions of particular embodiments can be achieved by any means as is known in the art. Distributed systems, networked systems, components, and/or circuits can be used for implementation. Communication, or transfer, of data may be achieved using wired, wireless, or by any other means.

It will also be appreciated that one or more of the elements depicted in the drawings or figures can also be implemented in a more separated manner or integrated manner, or even removed or rendered as inoperable in certain cases, so as to render the system to be useful in accordance with a particular application.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt to a particular situation or material without deviating from the essential scope and spirit of this invention.

We claim:

1. A method for adding a Malware Detection System to a plurality of Low Power and Low Complexity Sensors sending a plurality of Encrypted Sensor Data Messages to Low Power and Low Complexity Sensor Networks wherein a plurality of Machine Learning Systems are applied, the plurality of Machine Learning Systems consisting of a plurality of interconnected Decryption Engines, a plurality of Processing Engines, and a plurality of Data Stores, the method comprising:

a. said Low Power and Low Complexity Sensors comprised of low power devices with low processing capability and reduced functionality, the low power devices sending the plurality of said Encrypted Sensor Data Messages to said Low Power and Low Complexity Sensor Networks, comprised of at least one Decryption Engine;
   b. said at least one Decryption Engine continuously receiving the plurality of Encrypted Sensor Data Messages from said Low Power and Low Complexity sensor networks and attempting to decrypt said Encrypted Sensor Data Messages by applying a plurality of decryption algorithms;
   c. storing Failed Encrypted Sensor Data Messages into one or more Failed Decryption Sensor Message Data Stores, wherein the Failed Encrypted Sensor Data Messages are identified by said at least one Decryption Engine;
   d. selecting at least one Processing Engine from the plurality of Processing Engines for continuously and autonomously retrieving one or more of the failed Encrypted Sensor Data Messages from said one or more Failed Decryption Sensor Message Data Stores;
   e. said at least one Processing Engine continuously and autonomously processing said one or more of the failed Encrypted Sensor Data Messages, which comprises randomly fragmenting said failed Encrypted Sensor Data Messages into a plurality of smaller Encrypted Sensor Data Messages which are then stored as a plurality of fragmented Encrypted Sensor Data Messages in one or more said Failed Decryption Sensor Message Data Stores;
   f. configuring said at least one Processing Engine to at least one Machine Learning System;
   g. configuring said at least one Machine Learning System to retrieve a plurality of Machine Learning Models, a plurality of Machine Learning Algorithms, and a plurality of Malware Machine Learning Feature Sets to learn a plurality of known malware from historic malware related data;
   h. said at least one Machine Learning System continuously generating a plurality of new Malware Machine Learning Models, a plurality of new Machine Learning Algorithms and a plurality of new Malware Machine Learning Feature Sets to recognize a plurality of malware attacks from said failed Encrypted Sensor Data Messages;
   i. configuring said at least one Machine Learning System to use said new Malware Machine Learning Models, said new Machine Learning Algorithms, and said new Malware Machine Learning Feature Sets to continuously and autonomously detect malware in said Low Power and Low Complexity Sensor Networks by retrieving the plurality of said filed Encrypted Sensor Data Messages from said one or more Failed Decryption Sensor Message Data Stores; and
   j. enabling said at least one Machine Learning System to continuously and autonomously learn a plurality of Evolving Malware Attacks and storing a plurality of new Evolving Malware Machine Learning Models and a plurality of new Evolving Malware Machine Learning Feature Sets back into the at least one Machine Learning system.

2. The method of claim 1 wherein the at least one Machine Learning System employs Bernoulli Probability for classifying the failed Encrypted Sensor Data Messages.

3. The method of claim 1 wherein the at least one Machine Learning System performs multiclass categorization for classifying the failed Encrypted Sensor Data Messages into one or more target classes.

4. The method of claim 1 wherein the at least one Machine Learning System employs a one-dimensional bit-level Convolutional Neural Network model to classify data.

5. The method of claim 1 wherein the historic malware related data includes malware binary code.

6. The method of claim 1 wherein the historic malware related data includes malware source-code.

7. The method of claim 1 wherein the historic malware related data includes malware authors.

8. The method of claim 1 wherein the historic malware related data includes malware attack vectors.

9. The method of claim 1 wherein the historic malware related data includes malware attack surfaces.

10. The method of claim 1 wherein the at least one Machine Learning System is manually updated with newly discovered malware from other sources by system administrators.

11. The method of claim 1 wherein the plurality of Malware Machine Learning Models, the plurality of Malware Machine Learning Feature Sets, the plurality of Machine Learning Algorithms, the plurality of Evolving Malware Machine Learning Models and the plurality of new Evolving Malware Machine Learning Feature Sets associated with malware attacked Encrypted Sensor Data Messages are placed in one or more Data Stores for further processing in other applications including Natural Language Processing.

* * * * *